(12) United States Patent
Kessel et al.

(10) Patent No.: US 7,763,670 B2
(45) Date of Patent: Jul. 27, 2010

(54) INKS FOR IN-MOULD DECORATION

(75) Inventors: Stewart Kessel, Kent (GB); Clive Lawrence, London (GB); Nandakumar Menon, Aurora, IL (US)

(73) Assignee: Sun Chemical Corporation, Parsippany, NJ (US)

( * ) Notice: Subject to any disclaimer, the term of this patent is extended or adjusted under 35 U.S.C. 154(b) by 1408 days.

(21) Appl. No.: 10/451,279

(22) PCT Filed: Sep. 26, 2001

(86) PCT No.: PCT/GB01/04290

§ 371 (c)(1),
(2), (4) Date: May 27, 2005

(87) PCT Pub. No.: WO02/50186

PCT Pub. Date: Jun. 27, 2002

(65) Prior Publication Data

US 2006/0052477 A1    Mar. 9, 2006

(30) Foreign Application Priority Data

Dec. 21, 2000    (GB)    ................. 0031364.3

(51) Int. Cl.
C08J 3/28    (2006.01)
C08F 2/46    (2006.01)
B28B 19/00    (2006.01)

(52) U.S. Cl. ............... 522/97; 522/71; 522/74; 522/90; 522/96; 522/150; 522/151; 522/152; 522/173; 522/174; 522/909; 264/259; 264/267; 264/269; 427/133; 427/508; 427/510; 427/511; 427/514; 427/517

(58) Field of Classification Search ............... 522/71, 522/74, 90, 96, 97, 150, 151, 153, 173, 174, 522/908; 264/259, 267, 269; 427/133, 508, 427/510, 511, 514, 517
See application file for complete search history.

(56) References Cited

U.S. PATENT DOCUMENTS

| 5,219,896 A | 6/1993 | Coady et al. |
| 5,648,414 A | 7/1997 | Bier et al. |
| 6,410,095 B1 | 6/2002 | Brahm et al. |
| 6,652,983 B1 * | 11/2003 | Mori ..................... 428/480 |
| 6,773,653 B2 * | 8/2004 | Miller et al. .............. 264/447 |
| 2003/0187089 A1 * | 10/2003 | Hohenrieder et al. ....... 522/173 |

FOREIGN PATENT DOCUMENTS

| JP | 5070534 | 3/1993 |
| JP | 5070535 | 3/1993 |
| JP | 6145276 | 5/1994 |

* cited by examiner

*Primary Examiner*—Sanza L McClendon
(74) *Attorney, Agent, or Firm*—Dickstein, Shapiro, LLP.

(57) ABSTRACT

An energy-core ink or varnish composition is provided for use in an in-mold decoration (IMD) process, comprising an energy-curable resin, additional reactive monomers and/or oligomers and, optionally and in an amount not exceeding 10% by weight, a solvent, wherein the resin comprises a urethane acrylate oligomer having an aromatic or aliphatic polycarbonate backbone. For inks, the composition additionally includes a pigment or dye. For photocure compositions, a photoinitiator is also included. Also provided is an in-mold decoration (IMD) process employing the ink or varnish composition.

18 Claims, No Drawings

INKS FOR IN-MOULD DECORATION

The present invention relates to a new ink composition for in-mould decorative use and to an in-mould decorative process employing this ink.

In its broadest sense, in-mould decorating (IMD) simply means applying a decoration in the course of moulding the decorated part. A particular IMD process referred to as insert moulding or insert IMD has been known for many years, but has seen little practical uses except in the automotive industry, until recently. In insert IMD processes, a film substrate is printed with the desired decoration this is preferably a second surface printing process in which the decoration is printed in reverse on the reverse side of a transparent or translucent (or partially transparent or translucent) film substrate, so that it shows through and is protected by the substrate. Then, in one or more steps, the substrate is, if necessary, formed into shape and further resin or plastics material is injection moulded to give the final product.

It will be seen readily that this process can give rise to several difficulties. First, if the printed substrate is to be moulded after printing, the printing ink must have the necessary mechanical properties to wild the strains of moulding. Thus, it must be flexible, and preferably have at least a similar flexibility to that of the substrate, so as to stretch with the substrate as the substrate is moulded. It must also have sufficient adhesion to the substrate and abrasion resistance to withstand any abrading action in the course of moulding.

In the final step, where a liquid resin or resin precursor is injected onto the formed decorated substrate, the printing ink must be able to resist the heat, pressure and shear imparted to it by the resin injection, or it has to be protected with an additional layer. Otherwise, the ink will be caused to degrade or smudge from its printed location by the injection process, resulting in so-called "wash-out".

Finally, the ink has to be compatible with the injected resin and in particular must provide a good adhesion with the injected resin so as to prevent delamination of the printed substrate from the resin backfill.

One way of solving the problems of avoiding wash-out of the ink and ensuring good adhesive bond strength to the resin backfill has been to provide the printed substrate with an additional coating over the irk which additional coating is typically an aqueous laminating adhesive that is applied over the graphic inks. This coating then serves to bond or laminate an additional sheet of substrate such that the ink is sandwiched between the substrate and the additional sheet of substrate. In this twin-layer construction, the laminated substrate serves to protect the ink against wash-out by the backfill injection and provides good adhesion to the injected resin. However, this construction method requires additional processing steps and material cost.

DE-A-19832570 discloses a solvent-based ink system comprising a blend of a polycarbonate and a thermoplastic polyester polyurethane. U.S. Pat. No. 5,648,414 discloses a solvent-based ink suitable for insert IMD, containing a polycarbonate based on geminally disubstituted, dihydroxydiphenyl cycloalkanes as binder. One such ink is commercially available as Noriphan™ (ex Proll under licence from Bayer AG). Whilst this solvent-based ink permits a single-layer printed substrate construction to be used in IMD processes, it is associated with certain disadvantages. For example, because it is a solvent-based ink, it is relatively difficult or inconvenient to screen print due to its poor press stability and difficulties in washing up. Also, the printed substrate has been found to be susceptible to curling, and it is often therefore difficult to place the printed substrate in registration in the mould tool prior to injection with the resin backfill. Furthermore, it is essential to ensure that all solvent is completely removed before the printed substrate is formed and injection moulded, in order to prevent wash-out, and blister or bubble formation, leading to delamination. Another disadvantage is that the range of colours available is limited due to the fact that certain pigments can break down the polymer resin. Finally, the need for a solvent in the ink has obvious environmental and health hazard implications.

These deficiencies associated with solvent-based systems have led to the development of photocurable ink systems, for example inks curable by UV-energy, for use in IMD processes, which require less or no solvent. However, existing UV-curable inks are not wholly satisfactory, particularly in terms of formability, washout resistance and adhesion to injected resin backfill. It will be appreciated that inks suitable for IMD must have very good adhesion to the substrate, good flexibility and elongation to permit forming with the substrate, good mechanical resistance to abrasion by the moulds, good washout resistance to the resin injection step, and good adhesive bonding to the injected resin backfill. Because UV-curable inks undergo cross-linking, it is far more difficult to achieve this combination of properties in a UV-curable ink than in a solvent-based ink.

Although these UV-curable ink systems have eliminated or reduced the solvent, and hence the problems associated with the use of solvent in a solvent-based ink system the need for flexibility and elongation has meant that the inks have tended to be too so* to withstand the mechanical impact of the forming and injection processes. In addition adhesion to the resin backfill was often not satisfactory. Therefore, it was generally still found necessary to provide the printed substrate with a protective or tie coating, in order to ensure adequate resistance to the resin injection process and to provide good bonding to the backfill resin, so as to avoid wash-out, delamination, or both. In addition to boost adhesion to the substrate and avoid delamination at the ink:substrate interface, it was generally still necessary to include aggressive monomers, such as N-vinyl-2-pyrrolidone (NVP), in the ink, which in turn have associated drawbacks, for example they may lead to delamination due to unreacted material, and to health and safety concerns.

We have now found, surprisingly, that it is possible to provide an energy-curable composition, preferably a UV-curable ink, suitable for use in IMD processes, that can be printed onto a substrate, that allows the printed substrate to be formed using conventional forming techniques, and back-filled with a resin injection without undergoing wash-out, even in the absence of a protective coating. Furthermore, the ink can provide excellent adhesion to the resin backfill without the need for a tie coating. Because the claimed energy-curable resin composition gives improved adhesion the requirement for NVP is reduced or eliminated. A fisher advantage is that solvent may be significantly reduced or even eliminated from the IMD process. The reduction or removal of solvent or NVP, or both, may lead to further advantages, apart from obvious environmental and health considerations, such as reduced delamination of the final part especially in environmental testing, caused by poor removal or poor full reaction of potentially volatile materials.

In addition, we have found that ink compositions according to the present invention can provide a harder, tougher surface, when cured, than conventional insert IMD inks that contain high molecular weight urge acrylate resins, whilst exhibiting excellent flexibility and forming characteristics. It will be appreciated that hardness and toughness are desirable in an insert IMD ink in order to avoid accidental marking or damage caused by forming or moulding tools.

Broadly speaking, this has been achieved by using a new urethane acrylate resin having a polycarbonate backbone as carrier for the pigment or dye.

Accordingly, in a first aspect, the present invention provides an energy-cure ink or varnish composition for use in an in-mould decoration (IMD) process, comprising an energy-curable resin, additional reactive monomers and/or oligomers and, optionally and in an amount not exceeding 10% by weight of the composition, a solvent, wherein the energy-curable resin comprises a urethane acrylate, oligomer having an aromatic or aliphatic-polycarbonate backbone.

In a second aspect, the invention provides a method of in-mould decoration employing the ink or varnish composition.

By "energy-curable resin" or "energy-cure compositions", as used herein, is meant a resin or composition that is curable by exposure to a source of radiation of an appropriate wavelength or intensity, i.e. is photocurable by exposure to a source of electromagnetic radiation of an appropriate wavelength, such as ultraviolet (UV) radiation, or is electron beam (EB) curable by exposure to an electron beam of an appropriate intensity. Preferably, the energy-cure compositions according to the present invention are at least UV-curable.

The energy-cure compositions according to the invention contain an energy-curable resin, additional reactive monomers and/or oligomers, additives and, in the case of an ink composition, pigments or dyes. In the case of photocure compositions such as UV-cure compositions, a photoinitiator is also included in the composition.

Energy-Curable Resin:

The energy-curable resin at least comprises a mono-, di- or trifunctional urethane acrylate oligomer that has a polycarbonate backbone and is obtainable by reaction of a diisocyanate, a hydroxy (meth)acrylate functional unsaturated monomer and a polycarbonate polyol. Preferably, the resin at least comprises a mono- or difunctional urethane acrylate oligomer, as represented by the general formula (I) or (II):

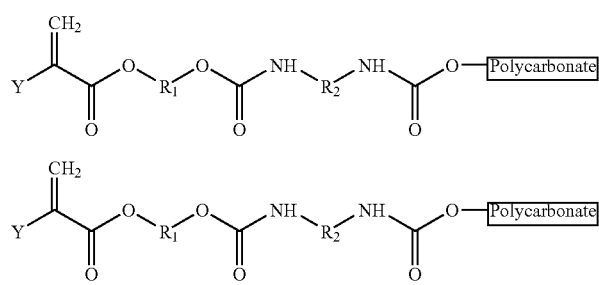

wherein:

$R_2$ and $R_3$ are such that OCN—R—NCO (where R=$R_2$ or $R_3$) represents the diisocyanate used in the synthesis;

Y represents a hydrogen atom or a methyl group;

$R_1$ and $R_4$ together with their attached (meth)acrylate group represent the residue of the hydroxy (meth)acrylate functional unsaturated monomer used in the synthesis.

Examples of the diisocyanate compounds include, but are not limited to, hexamethylene diisocyanate (HMDI), isophorone diisocyanate (IPDI), 4,4-dicyclohexylmethane diisocyanate ($H_{12}$MDI), 2,2,4-trimethyl hexamethylene diisocyanate 2,4-tolylene diisocyanate (TDI), 2,6-tolylene diisocyanate (TDI), trimethylhexamethylene diisocyanate (TMDI), diphenylmethane diisocyanate (MDI), tetramethylxylene diisocyanate (TMXDI), and xylene diisocyanate (XDI). A preferred isocyanate is isophorone diisocyanate (IPDI) because of improved resistance and selective reactivities of the isocyanate groups enabling preparation of an ethylenically unsaturated monoisocyanate. The above diisocyanate compounds may be used individually or in combination.

Examples of the hydroxy (meth)acrylate functional unsaturated monomers include, but are not limited to, 2-hydroxyethyl acrylate, 2-hydroxyethyl methacrylate, 2-hydroxypropyl acrylate, 1,4-butanediol monoacrylate and glyceryl diacrylate, trimethylolethane di(meth)acrylate.

Suitable polycarbonate polyols are represented by the general formula (III):

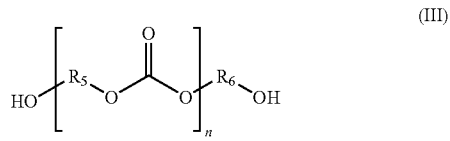

wherein:

$R^5$ and $R^6$ represent the same or different aliphatic or aromatic groups; and n is an integer of 1 to 60.

The polycarbonate polyols can be produced through, for example, an ester interchange reaction or alcoholysis of diethyl carbonate or diphenyl carbonate with a polyol, preferably a diol such as an alkylene diol, e.g. 1,4-butane diol, 1,6-hexane diol, or an alkylene ether diol. e.g. triethylene glycol, tripropylene glycol. Other suitable diols include 2,2-bis-[4-(2-hydroxypropoxy)phenyl]propane and 1,1-bis-(4-hydroxyphenyl)-3,3,5-trimethyl cyclohexane.

Polyols with three or more hydroxyl groups, such as trimethylol propane, glycerine and pentaerythritol, can be incorporated for preparing polycarbonate polyols suitable for synthesising trifunctional polycarbonate urethane acrylates.

Mixtures of the polycarbonate polyols may also be utilised in the synthesis. Other polyols such as polyether- or polyester-polyols may also be included, although to achieve the desired IMD properties the backbone should be substantially polycarbonate in nature.

The polycarbonate backbone may be aliphatic or aromatic but preferably is aliphatic in nature. It may be linear or branched, and is preferably linear.

Suitable polycarbonate backboned urethane acrylates are available as NTX 4711 and NTX 4867 (ex Sartomer). RD2/105. RD2/106. RD3/101, RD3/102, RD4/103 and RD4/104 (ex UCB Chemicals SA), and RXX-01-344 (ex Rahn).

We prefer that the polycarbonate urethane acrylate (PCUA) oligomer has a average molecular weight in the range of from 1,000 to 30,000, more preferably from 3,000 to 15,000, still more preferably from 4,000 to 10,000, and in particular from 6,500 to 10,000. For the purposes of providing improved flexibility and elongation, higher molecular weight polycarbonate backbones would be desirable. However, higher molecular weights can have an adverse effect on the viscosity and printability of the ink. Moreover, higher molecular weights tend to produce unduly soft ink coatings, which are more susceptible to marking by mould parts or during handling. Thus, it will be appreciated that the particular molecular weight chosen will represent a compromise between these conflicting factors, on the one hand providing acceptable flexibility and elongation whilst on the other hand, ensuring satisfactory viscosity, printability and hardness.

If desired, the flexibility, elongation and hardness properties of the ink can be tailored by blends of monofunctional, difunctional or trifunctional PCUA oligomer. It will be appreciated that the higher degrees of cross-linking afforded by inclusion of di- and trifunctional oligomers will tend to reduce the overall flexibility and elongation of the ink, and increase its hardness.

Thus, the energy-curable resin may comprise a mono-, di- or trifunctional polycarbonate urethane acrylate oligomer, or a blend of two or more of mono-, di- and trifunctional polycarbonate urethane acrylate oligomers. Preferably, the energy-curable resin at least comprises a mono- or difunctional polycarbonate urethane acrylate oligomer, or a blend thereof. We prefer that the average functionality of the energy-curable resin is less than 2.5, more preferably less than 2.2, and most preferably less than 2.1.

The monofunctional polycarbonate urethane acrylate may be present in the composition in an amount of from 0 to 70% by weight. Difunctional polycarbonate urethane acrylate may be included in an amount from 0 to 50% by weight. Trifunctional polycarbonate urethane acrylate may be included in an amount from 0 to 5% by weight. The total polycarbonate urethane acrylate component is present in an amount of from 5 to 70%, preferably from 20 to 60%, by weight of the composition.

Photoinitiators:

Preferably the compositions according to the invention are at least photocurable, and most preferably are UV-curable, and accordingly contain a photoinitiator. However, it will be appreciated that EB-cure compositions in accordance with the invention can be formulated without the need for a photoinitiator.

For photocure compositions such as UV-cure compositions, a wide range of commercially available photoinitiators can be incorporated to initiate the photocure mechanism. Preferably these photoinitiators have low potential to migration and low volatility, so as to avoid problems such as delamination of the injection moulded part. The photoinitiator package should also have low UV thermal yellowing, important to meet typical heat and environmental cycling tests typically used on the final IMD part. The photoinitiator package is typically present in an amount of from 0.5 to 20% for example from 1 to 14%, by weight of the composition.

Suitable photoinitiators include, for example, 2,4,6-trimethylbenzyl diphenyl phosphine oxide (Lucerin™ TPO, ex BASF), bis(2,4,6-trimethylbenzoyl)phenyl phosphine oxide (Irgacure 819, ex Ciba Geigy), bis(2,6-dimethoxybenzoyl)-2,4,4-trimethylpentyl phosphine oxide, ethyl-2,4,6-trimethylbenzoylphenyl-phosphinate (Lucerin™. TPO-L, ex BASF), 2-benzyl-2-dimethylamino-1-(4-morpholinphenyl) butan-1-one (Irgacure™ 369, ex Ciba Geigy), 1-hydroxycyclohexyl acetophenone (Irgacure™ 184, ex Ciba Geigy), isopropyl thioxanthone (Quantacure™ ITX, ex IBIS or Speedcure™ ITX, ex Lambson; 2-chloro thioxanthone (Kayacure™ CTX, ex Nippon Kayaku), oligo[2-hydroxy-2-methyl-1-[4-(1-methylvinyl)phenyl]propanone and 2-hydroxy-2-methyl-1-phenyl-1-propanone (Esacure™ KIP100F, ex Lamberti), methyl benzoyl formate (Genocure MBF ex Rahn), benzophenone, 2-methyl-1-[4-(methylthio) phenyl]-2-morpholinopropan-1-one (Irgacure™ 907, ex Ciba Geigy). Of these, 2,4,6-trimethylbenzoyl diphenyl phosphine oxide (Lucerin™ TPO, ex BASF), bis(2,4,6-trimethylbenzoyl)-phenyl phosphine oxide (Irgacure 819, ex Ciba Geigy), and bis(2,6-dimethoxybenzoyl)-2,4,4-trimethylpentyl phosphine oxide are preferred photoinitiators.

Additional Reactive Monomers and/or Oligomers:

Additional reactive energy-cure monomers and/or oligomers may be present in an amount of from 0 to 80%, preferably from 0 to 60%, by weight of the composition. These reactive monomers and/or oligomers are preferably monofunctional.

Suitable acrylate monomers or oligomers include, but are not limited to, isobornyl acrylate (IBOA), 2-phenoxy ethyl acrylate (2PEA), 2-(2-ethoxyethoxy) ethyl acrylate (EOEOEA). CTF acrylate, 4-t-butylcyclohexyl acrylate. THF-acrylate, alkoxylated acrylates, diethylene glycol diacrylate, dipropylene glycol diacrylate, 1,6-hexanediol diacrylate, low molecular weight monofunctional urethane acrylates, polyether acrylates, polyester acrylates and low molecular weight epoxy acrylates.

Non-acrylated reactive diluents that may be incorporated include, but are not limited to, acryloyl morpholine (ACMO), n-vinylformamide (NVF), n-vinylformamide derivatives and n-vinyl caprolactam (NVC).

The compositions of the invention can provide improved adhesion to the substrate and backfill, thereby advantageously allowing the incorporation of N-vinyl-2-pyrrolidone (NVP) to be significantly reduced or even eliminates NVP is conventionally used to boost adhesion to the substrate, but concerns about health and safety, and its effect due to the volatility of unreacted material on delamination, means that it would be advantageous to eliminate, or at least reduce, NVP. Nevertheless, in certain cases it will still be desirable to include monomers such as NVP in the ink and varnish compositions of the invention, to improve 'key' to substrate. If used, NVP can be incorporated in an amount not exceeding 30%, preferably not exceeding 15%, more preferably not exceeding 10%, and in particular not exceeding 5%, by weight of the composition. Most preferably, the composition is free of NVP.

Additives:

If desired, inert or passive resins such as acrylics, styrene acrylates, polyesters, polycarbonates or celluloses may be included in the ink in small amounts, in order to improve the adhesion of the ink coating. However, these inert or passive resins tend to adversely affect the resistance of the ink to injection of the backfill resin, and thus increase the likelihood of wash-out. If included, therefore, we that only a small amount is used, for example an amount not exceeding 10%, and preferably not exceeding 7%, by weight of the composition.

Additives such as wetting agents, silicone and non-silicone antifoams may be incorporated to improved print properties such as substrate wetting and flow-out, and may be included in an amount of from 0 to 5%, preferably from 0 to 2%, by weight of the composition. It should be noted that some additives, typically with low molecular weights, may have a tendency to migrate to the print surface in the cured coating. This can affect the IMD properties, and therefore the total additive content should be kept to a minimum and additives with a high migration potential avoided.

Where the composition is intended for use as an ink, instead of a varnish, a pigment or dye is included in the composition. Organic and/or inorganic pigments or dyes can be incorporated in an amount of from 0 to 50%, preferably from 0 to 40%, by weight of the composition. The pigments or dyes should be selected to have good resistance to thermal decomposition and change, and resistance to sublimation.

Suitable pigments include, but not limited to, titanium dioxide white, zinc sulphide, carbon black, azo diarylide yellow, isoindoline yellow, diarylide orange, quinacridone magenta, diketo-pyrrolo-pyrrol red, copper phthalocyanine blue, copper phthalocyanine green, dioxazine violet, diketometal oxides. Speciality effect pigments, such as metal oxide-coated mica pigments and aluminium metallic pigments, can also be included.

Fillers may be included to control the viscosity and rheology of the composition typically to improve printing characteristics, and may be present in an amount of from 0 to 40%, preferably from 0 to 30%, by weight of the composition.

Suitable fillers include, but not limited to, calcium carbonate, china clay, aluminium hydrate, talc, barium sulphate, aluminium silicate, and silica.

It will be appreciated that the compositions according to the invention will be substantially free of organic solvent. However, small amounts of organic solvent may be included, if needed, in amounts not exceeding 10%, and preferably not exceeding 5%, by weight of the composition. Most preferred is that the composition is free of organic solvent.

In-Mould Decorating (IMD) Process:

The energy-cure compositions of the invention are particularly suitable for use in IMD processes, and especially in insert IMD or insert moulding processes. The application of the compositions to the substrate may be effected using conventional printing techniques. Preferred techniques include flexographic, lithographic, digital and screen print processes, but other methods may be used as appropriate. Application by screen printing is particularly preferred.

Suitable substrate materials onto which the ink may be printed or the varnish applied as the case may be, include print-receptive polyester, polycarbonate, ABS. PMMA, polycarbonate/polyester blends, polycarbonate/ABS blends materials such as those supplied by Bayer AG (Bayfol®, Makrolon®, Marofol®, Bayblend®), GE Structured Products (Lexan®) and Autotype (Autoflex Hiform™, Autoflex XtraForm™). Preferably, the substrate is of a polycarbonate or polycarbonate/polyester blend resin material.

Similarly, suitable backfill materials which may be injected onto the printed substrate include the following or blends of the following: polyesters polycarbonate, styrenes ABS and PMMA resin materials. Preferably, the injected backfill is of polycarbonate or a polycarbonate/polyester blend resin material.

The invention will be further illustrated by reference to the following non-limiting Examples:

EXAMPLES

A) Formulations:

EXAMPLE 1

Comparative

Solvent-Based IMD Technology

A sample of Noriphan™ black HTR952 was obtained (ex Proll) for comparison to UV IMD ink technology.

Prints of Noriphan™ were prepared in accordance to the Noriphan™ product data sheet supplied by Proll. The prints were examined for adhesion, surface hardness, print curl, forming, and IMD properties.

Example 2

Comparative

Standard Flexible Urethane Acrylate Technology

The following screen ink composition was prepared by first premixing the materials and then grinding the resultant mixture on a triple roll mill until a grind of <12 microns (µm) was achieved.

| | |
|---|---|
| Urethane acrylate, Actilane ™ 290 | 24.0 |
| IBOA, SR506 ex Sartomer | 31.8 |
| NVP ex BASF or ISP | 12.0 |
| Silicone antifoam | 0.7 |
| UV Stabiliser, Genorad ™ 16 ex Rahn | 0.5 |
| Lucerin ™ TPO ex BASF | 4.0 |
| Irgacure ™ 184 ex Ciba | 3.0 |
| Filler | 20.0 |
| Carbon Black | 4.0 |
| Total (weight %) | 100.0 |

Single and multilayer prints of the above screen ink composition were printed through a 150-34 mesh onto a polycarbonate substrate and cured using a medium pressure mercury lamp (80 Wcm$^{-1}$). The prints were examined for adhesion, surface hardness, forming, and IMD properties.

Example 3

Invention

Polycarbonate Urethane Acrylate Technology

The following screen ink composition was prepared by first premixing the materials and then grinding the resultant mixture on a triple roll mill until a grind of <12 microns (µm) was achieved.

| | |
|---|---|
| PCUA, NTX 4867 | 34.3 |
| IBOA, SR506 ex Sartomer | 23.5 |
| UV Stabiliser, Genorad ™ 16 ex Rahn | 0.5 |
| Silicone antifoam | 0.7 |
| Lucerin ™ TPO ex BASF | 4.0 |
| Quantacure ™ ITX ex IBIS | 1.0 |
| NVP ex BASF | 12.0 |

-continued

| | |
|---|---|
| Filler | 20.0 |
| Carbon Black | 4.0 |
| Total (weight %) | 100.0 |

Single and multilayer prints of the above screen ink composition were printed through a 150-34 mesh onto a polycarbonate substrate and cured using a medium pressure mercury lamp (80 Wcm$^{-1}$). The prints were examined for adhesion, surface hardness, print curl, forming, and IMD properties.

Example 4

Invention

Polycarbonate Urethane Acrylate Technology (NVP Free)

The following screen ink composition was prepared by first premixing the materials and then grinding the resultant mixture on a triple roll mill until a grind of <12 microns (μm) was achieved.

| | |
|---|---|
| PCUA, NTX 4867 ex Sartomer | 36.4 |
| EOEOEA, S256 ex Sartomer | 8.7 |
| IBOA, SR506 ex Sartomer | 11.9 |
| NVC, ex BASF or ISP | 18.1 |
| Polyester urethane acrylate ex Rahn | 3.8 |
| UV stabiliser, Genorad ™ 16 ex Rahn | 0.4 |
| Lucerin ™ TPO ex BASF | 4.7 |
| Irgacure ™ 184 ex Ciba | 2.6 |
| Silicone antifoam | 0.7 |
| Carbon black | 3.6 |
| Filler | 9.1 |
| Total (weight %) | 100.0 |

Single and multilayer prints of the above screen ink composition were printed through a 150-34 mesh onto a polycarbonate substrate and cured using a medium pressure mercury lamp (80 Wcm$^{-1}$). The prints were examined for adhesion, surface hardness, forming, and IMD properties.

Example 5

Invention

Polycarbonate Urethane Acrylate Technology (NVP Free)

The following screen ink composition was prepared by first premixing the materials and then grinding the resultant mixture on a triple roll mill until a grind of <12 microns (μm) was achieved.

| | |
|---|---|
| PCUA, NTX 4867 | 40.0 |
| IBOA, SR506 ex Sartomer | 11.8 |
| UV Stabiliser, Genorad ™ 16 ex Rahn | 0.5 |
| Silicone antifoam | 0.7 |
| Lucerin ™ TPO ex BASF | 4.0 |
| Irgacure ™ 184 ex Ciba Geigy | 1.0 |
| ACMO ex Rahn | 18.0 |
| EOEOEA, SR256 ex Sartomer | 8.0 |
| Filler | 10.0 |
| Red | 6.0 |
| Total (weight %) | 100.0 |

Single and multilayer prints of the above screen ink composition were printed through a 150-34 mesh onto a polycarbonate substrate and cured using a medium pressure mercury lamp (80 Wcm$^{-1}$). The prints were examined for adhesion, surface hardness, forming and IMD properties.

Example 6

Invention

Polycarbonate Urethane Acrylate Technology (NVP Free)

The following screen ink composition was prepared by first premixing the materials and then grinding the resultant mixture on a triple roll mill until a grind of <12 microns (μm) was achieved.

| | |
|---|---|
| PCUA, RD2/105 ex UCB | 25.8 |
| EOEOEA, S256 ex Sartomer | 6.0 |
| IBOA, SR506 ex Sartomer | 37.2 |
| ACMO ex Rahn | 7.0 |
| UV stabiliser, Genorad ™ 16 ex Rahn | 0.3 |
| Lucerin ™ TPO ex BASF | 4.0 |
| Genocure ™ MBF ex Rahn | 2.0 |
| Speedcure ™ ITX ex Lambson | 1.0 |
| Silicone antifoam | 0.7 |
| Phthalocyanine blue | 6.0 |
| Filler | 10.0 |
| Total (weight %) | 100.0 |

Single and multilayer prints of the above screen ink composition were printed through a 150-34 mesh onto a polycarbonate substrate and cured using a medium pressure mercury lamp (80 Wcm$^{-1}$). The prints were examined for adhesion, surface hardness, forming, and IMD properties.

Example 7

Invention

Polycarbonate Urethane Acrylate Technology

The following screen ink composition was prepared by first premixing the materials and then grinding the resultant mixture on a triple roll mill until a grind of <12 microns (μm) was achieved.

| | |
|---|---|
| PCUA, RXX0] 344 ex Rahn | 26.0 |
| IBOA, SR506 ex Sartomer | 27.0 |
| NVP ex BASF or ISP | 12.0 |
| UV stabiliser, Genorad ™ 16 ex Rahn | 0.3 |
| Lucerin ™ TPO ex BASF | 4.0 |
| Silicone antifoam | 0.7 |
| Titanium dioxide white pigment | 30.0 |
| Total (weight %) | 100.0 |

Single and multilayer prints of the above screen ink composition were printed through a 150-34 mesh onto a polycarbonate substrate and cured using a medium pressure mercury lamp (80 Wcm$^{-1}$). The prints were examined for adhesion, surface hardness, forming, and IMD properties.

Example 8

Invention

Polycarbonate Urethane Acrylate Technology (NVP Free)

The following screen ink composition was prepared by first premixing the materials and then grinding the resultant mixture on a triple roll mill until a grind of <12 microns (μM) was achieved.

| | |
|---|---|
| PCUA, RD3/101 ex UCB | 40.0 |
| EOEOEA, S256 ex Sartomer | 6.0 |
| IBOA, SR506 ex Sartomer | 15.0 |
| ACMO ex Rahn | 7.0 |
| UV stabiliser, Genorad ™ 16 ex Rahn | 0.3 |
| Lucerin ™ TPO ex BASF | 4.0 |
| Genocure ™ MBF ex Rahn | 2.0 |
| Speedcure ™ ITX ex Lambson | 1.0 |
| Silicone antifoam | 0.7 |
| Red | 6.0 |
| Filler | 18.0 |
| Total (weight %) | 100.0 |

Single and multilayer prints of the above screen ink composition were printed through a 150-34 mesh onto a polycarbonate substrate and cured using a medium pressure mercury lamp (80 Wcm$^{-1}$). The print were examined for adhesion, surface hardness, forming, and IMD properties.

B) Experimental Results:

1) Physical Properties

TABLE 1

Pencil Hardness

| Ink system | Hardness* | Comments |
|---|---|---|
| Example 1 | H | Can be marked, but good scratch resistance |
| Example 2 | HB | Moderate scratch, easily marked |
| Example 3 | 2H | Difficult to scratch, excellent adhesion |
| Example 4 | H-2H | Difficult to scratch, excellent adhesion |
| Example 5 | H-2H | Difficult to scratch, excellent adhesion |
| Example 6 | H | Difficult to scratch, excellent adhesion |
| Example 7 | H | Difficult to scratch, excellent adhesion |
| Example 8 | H | Difficult to scratch, excellent adhesion |

*according to ASTM D3363, BS 3900-E19, ISO 15184

TABLE 2

Cross-Hatch Adhesion

| Ink system | Ranking** | Comments |
|---|---|---|
| Example 1 | 4-5 | No removal |
| Example 2 | 4 | Slight/no removal |
| Example 3 | 5 | No removal |
| Example 4 | 5 | No removal |
| Example 5 | 5 | No removal |
| Example 6 | 5 | No removal |
| Example 7 | 5 | No removal |
| Example 8 | 5 | No removal |

**1 = poor (total ink removal). 5 = excellent (no ink removal) according to BS 3900-E6. ISO 2409

2) Forming Properties

The printed substrates were examined for forming properties using the most commonly used techniques (vacuum thermoform. HPF-Niebling, hydroform, matched metal):

TABLE 3

Vacuum Thermoform

| Ink system | Ranking*** | Comments |
|---|---|---|
| Example 1 | 4 | Good forming, suitable for medium to deep draw |
| Example 2 | 3-4 | Mould marking can be a problem, inferior at high temps/long cycle times |
| Example 3 | 4 | Suitable for medium to deep draw, improved resistance to mould marking |
| Example 4 | 4 | Suitable for medium to deep draw, improved resistance to mould marking |
| Example 5 | 4 | Suitable for medium to deep draw, improved resistance to mould marking |
| Example 6 | 4 | Suitable for medium to deep draw, improved resistance to mould marking |
| Example 7 | 4 | Suitable for medium to deep draw, improved resistance to mould marking |
| Example 8 | 4 | Suitable for medium to deep draw, improved resistance to mould marking |

TABLE 4

HPF-Niebling

| Ink system | Ranking*** | Comments |
|---|---|---|
| Example 1 | 4 | Good forming suitable for medium to deep draw |
| Example 2 | 4 | Good forming suitable for medium to deep draw |
| Example 3 | 4 | Good forming suitable for medium to deep draw |
| Example 4 | 4 | Good forming suitable for medium to deep draw |
| Example 5 | 4 | Good forming suitable for medium to deep draw |
| Example 6 | 4 | Good forming suitable for medium to deep draw |
| Example 7 | 4 | Good forming suitable for medium to deep draw |
| Example 8 | 4 | Good forming suitable for medium to deep draw |

TABLE 5

Hydroform

| Ink system | Ranking*** | Comments |
|---|---|---|
| Example 1 | 3-4 | Moderate forming suitable for medium draw |
| Example 2 | 4 | Good forming suitable for medium to deep draw |
| Example 3 | 4 | Good forming suitable for medium to deep draw |
| Example 4 | 4 | Good forming suitable for medium to deep draw |
| Example 5 | 4 | Good forming suitable for medium to deep draw |
| Example 6 | 4 | Good forming suitable for medium to deep draw |
| Example 7 | 4 | Good forming suitable for medium to deep draw |
| Example 8 | 4 | Good forming suitable for medium to deep draw |

TABLE 6

Matched Metal

| Ink system | Ranking*** | Comments |
|---|---|---|
| Example 1 | 5 | Superior resistance to marking from mould tool |
| Example 2 | 2 | Composition too soft. marked by mould tool |
| Example 3 | 5 | Superior resistance to marking from mould tool |
| Example 4 | 5 | Slightly softer than Example 3 |
| Example 5 | 5 | Superior resistance to marking from mould tool |
| Example 6 | 5 | Superior resistance to marking from mould tool |
| Example 7 | 5 | Superior resistance to marking from mould tool |
| Example 8 | 5 | Superior resistance to marking from mould tool |

***1 = poor (not formable), 5 = excellent (deep draw possible within limits of forming technique)

3) Resistance to Wash-Out

The printed substrates were subjected to direct injection with a sprue gate, of a polycarbonate backfill. The degree of ink movement (wash-out) was visually assessed and ranked:

TABLE 7

Resistance to PC injection

| Ink system | Ranking**** | Comments |
|---|---|---|
| Example 1 | 5 | No wash-out, but total solvent removal critical |
| Example 2 | 2 | Wash-out, can be improved by use of tie/protective coat e.g. Aqualam ™ (ex Coates) |
| Example 3 | 5 | No wash-out |
| Example 4 | 5 | No wash-out |
| Example 5 | 5 | No wash-out |
| Example 6 | 5 | No wash-out |
| Example 7 | 5 | No wash-out |
| Example 8 | 4-5 | Slight wash-out directly around injection point |

****1 = poor (ink wash-out), 5 = excellent (no ink wash-out)

4) Adhesion or Bond to Injected Backfill Resin

The printed substrates were subjected to injection of polycarbonate resin using a plaque tool with a wide fan gate injection port. The bond strength between the backfill resin and the printed substrate was assessed by peel strength analysis:

TABLE 8

Peel Strength

| Ink system | Typical value (N) | Range (N) |
|---|---|---|
| Example 1 | 50 | 50.0-58.0 |
| Example 2 | 6.7 | 0.0-8.8 |
| Example 3 | 51.1 | 37.8-64.4 |
| Example 4 | 52.3 | 34.2-68.0 |
| Example 5 | 53 | 33.8-69.2 |
| Example 6 | 48.8 | 30.0-60.2 |

5) Resistance to Heat Ageing and Environmental Cycling

Heat ageing and environmental cycling test were undertaken on full IMD parts to ensure that there were no changes to e.g. laminate strength, colouristic properties after the heat/environmental cycles:

TABLE 9

Heat Ageing/Environmental Cycling

| Ink system | Delamination test | Comments |
|---|---|---|
| Example 1 | Pass | Thorough drying critical |
| Example 2 | Fail | Poor bond strength prior to testing |
| Example 3 | Pass | No appreciable loss of properties |
| Example 4 | Pass | No appreciable loss of properties |
| Example 5 | Pass | No appreciable loss of properties |
| Example 6 | Pass | No appreciable loss of properties |

TABLE 10

Heat Ageing/Environmental Cycling

| Ink system | Colouristic test | Comments |
|---|---|---|
| Example 1 | Pass | — |
| Example 2 | Fail | — |
| Example 3 | Pass | No appreciable loss of properties |
| Example 4 | Pass | No appreciable loss of properties |
| Example 5 | Pass | No appreciable loss of properties |
| Example 6 | Pass | No appreciable loss of properties |

6) Print Curl

Single and multilayer prints of Example 1 and Example 3 were prepared on 125 micron (μm) Bayfol® and assessed for degree of substrate curl or distortion after 24 hours.

TABLE 11

| Ink system | Number of print layers | Ink film thickness***** (μm) | Assessment of curl (mm) | Comment |
|---|---|---|---|---|
| Example 1 | 1 | 5 | >45 | Very poor |
|  | 2 | 12 | >47 | Very poor |
|  | 3 | 17 | >47 | Very poor |
|  | 4 | 22 | 49 | Very poor |
| Example 3 | 1 | 10 | 2 | — |
|  | 2 | 16 | 2-3 | — |
|  | 3 | 22 | 3 | — |
|  | 4 | 29 | 3-6 | Very slight curl |

*****Ink film thickness determined using digital micrometer and comparing printed (various number of ink deposits) and unprinted areas of the substrate.

The invention claimed is:

1. An insert in-mould decoration process, comprising introducing a molding material and an insert decoration into a mold and forming a molded part in which the insert decoration is contained by molding, wherein the insert decoration comprises an energy cured composition exposed on a surface a substrate, the energy composition comprising a urethane acrylate oligomer having an aromatic or aliphatic polycarbonate backbone energy-curable resin, additional reactive monomers and/or oligomers and optionally and in an amount not exceeding 10% by weight of the composition, a solvent.

2. The in-mould decoration process according to claim 1, wherein the composition is an ink and further comprises a pigment or dye.

3. The in-mould decoration process according to claim 2, wherein the pigment or dye is present in an amount of from 1 to 40% by weight of the composition.

4. The in-mould decoration process according to claim 1, wherein the composition is a photocure composition and further comprises a photoinitiator.

5. The in-mould decoration process according to claim 4, wherein the photoinitiator is present in an amount of from 1 to 14% by weight of the composition.

6. The in-mould decoration process according to claim 1 wherein the polycarbonate backbone is aliphatic.

7. The in-mould decoration process according to claim 1, wherein the polycarbonate backbone is linear.

8. The in-mould decoration process according to claim 1, wherein the polycarbonate-backboned urethane acrylate oligomer has a molecular weight of from 1,000 to 30,000.

9. The in-mould decoration process according to claim 1, wherein the polycarbonate-backboned urethane acrylate component is present in an amount of from 5 to 70% by weight of the composition.

10. The in-mould decoration process according to claim 1, wherein the polycarbonate-backboned urethane acrylate oligomer is of the general formula (I) or (II):

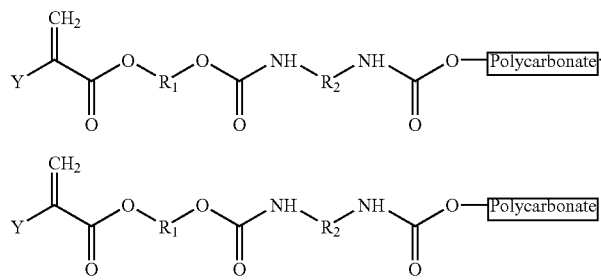
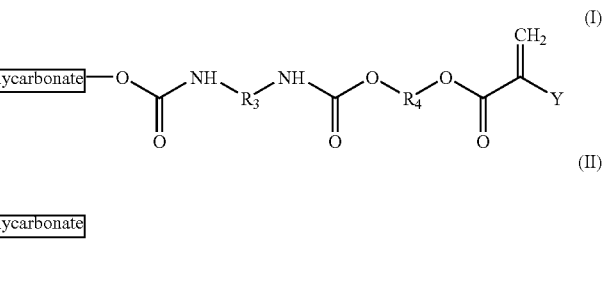

wherein: $R_2$ and $R_3$ are such that OCN—R—NCO (where R=$R_2$ or $R_3$) represents a diisocyanate; Y represents a hydrogen atom or a methyl group; $R_1$ and $R_4$ together with their attached (meth)acrylate group represent the residue of a hydroxy (meth)acrylate functional unsaturated monomer.

11. The in-mould decoration process according to claim 1, wherein the composition comprises additional acrylate monomer and/or oligomer and the acrylate monomer and/or oligomer is present in an amount of from 0 to 80% by weight of the composition.

12. The in-mould decoration process according to claim 11, wherein the acrylate monomer and/or oligomer is monofunctional.

13. The in-mould decoration process according to claim 1, wherein the composition comprises the reactive monomer N-vinyl-2-pyrrolidone (NVP), in an amount not exceeding 10% by weight of the composition.

14. The in-mould decoration process according to claim 1, wherein the composition comprises an organic solvent in an amount not exceeding 5% by weight of the composition.

15. The in-mould decoration process according to claim 1, wherein the composition is free of organic solvent.

16. The in-mould decoration process according to claim 2, wherein the ink is printed onto a polycarbonate or polycarbonate/polyester substrate.

17. An insert in-mould decoration process, comprising introducing a molding material and an insert decoration into a mold and forming a molded part in which the insert decoration is contained by molding, wherein the insert decoration comprises a substrate having an energy cured ink composition exposed on a surface thereof, the energy cured ink composition comprising a urethane acrylate oligomer having an aromatic or aliphatic polycarbonate backbone energy-curable resin, additional reactive monomers and/or oligomers and optionally and in an amount not exceeding 10% by weight of the composition, a solvent, and wherein the exposed ink on the substrate is subjected to polycarbonate or polycarbonate/polyester blend resin injection to provide a polycarbonate or a polycarbonate/polyester blend backfill adhered to the printed substrate.

18. The in-mould decoration process according to claim 1, wherein the polycarbonate-backboned urethane acrylate oligomer has a molecular weight of from 3,000 to 15,000.

* * * * *